(12) United States Patent
Callahan et al.

(10) Patent No.: US 10,685,396 B2
(45) Date of Patent: Jun. 16, 2020

(54) AUCTION SECURITY TOOL

(71) Applicant: Bank of America Corporation, Charlotte, NC (US)

(72) Inventors: Brian Callahan, Chatham, NJ (US); Jon Vernon, Belle Mead, NJ (US)

(73) Assignee: Bank of America Corporation, Charlotte, NC (US)

( * ) Notice: Subject to any disclaimer, the term of this patent is extended or adjusted under 35 U.S.C. 154(b) by 485 days.

(21) Appl. No.: 15/658,954

(22) Filed: Jul. 25, 2017

(65) Prior Publication Data

US 2018/0025419 A1   Jan. 25, 2018

Related U.S. Application Data

(60) Provisional application No. 62/366,430, filed on Jul. 25, 2016.

(51) Int. Cl.
*G06Q 30/08* (2012.01)
*G06F 9/455* (2018.01)
*G06F 21/62* (2013.01)
*G06F 8/30* (2018.01)

(52) U.S. Cl.
CPC .............. *G06Q 30/08* (2013.01); *G06F 8/30* (2013.01); *G06F 9/45529* (2013.01); *G06F 21/629* (2013.01)

(58) Field of Classification Search
CPC .... G06Q 30/08; G06F 9/45529; G06F 21/629
See application file for complete search history.

(56) References Cited

U.S. PATENT DOCUMENTS

2003/0105706 A1\* 6/2003 Stanglmayr ............ G06Q 30/08
705/37
2018/0047098 A1\* 2/2018 Young .................... G06Q 30/08

\* cited by examiner

*Primary Examiner* — Nelson S. Giddins
(74) *Attorney, Agent, or Firm* — Michael A. Springs

(57) ABSTRACT

An apparatus includes a code generator and a broadcaster. The code generator receives a first request from a first user and receives a second request from a second user. The code generator also generates, based on a first user role for the first user, a first segment of javascript code. The code generator also generates, based on a second user role for the second user, a second segment of javascript code. The code generator further communicates the first segment of the javascript code to a web browser of the first user and communicates the second segment of the javascript code to a web browser of the second user. The broadcaster receives a bid from the first user and communicates the bid to a server, the second user, and a third user.

21 Claims, 3 Drawing Sheets

US 10,685,396 B2

AUCTION SECURITY TOOL

RELATED APPLICATIONS AND CLAIM TO PRIORITY

This application claims priority to U.S. Provisional Application No. 62/366,430 filed Jul. 25, 2016 and titled "Mid Market Matching Session and Live Desk Axes."

TECHNICAL FIELD

This disclosure relates generally to a tool for securing a blind auction.

BACKGROUND

Digital auctions are becoming increasingly popular as an efficient way to buy and sell goods. The digital nature of the auction allows for blind auctions (e.g., for buyers and sellers to remain anonymous).

SUMMARY OF THE DISCLOSURE

According to an embodiment, an apparatus includes a code generator and a broadcaster. The code generator receives a first request from a first user and receives a second request from a second user. The code generator also generates, based on a first user role for the first user, a first segment of javascript code. The first segment includes a first portion of javascript code and a second portion of javascript code. The code generator also generates, based on a second user role for the second user, a second segment of javascript code. The first segment is different from the second segment and the second segment includes the first portion of javascript code but not the second portion of javascript code. The code generator further communicates the first segment of the javascript code to a web browser of the first user and communicates the second segment of the javascript code to a web browser of the second user. The broadcaster receives a bid from the first user and communicates the bid to a server, the second user, and a third user. The web browser of the second user and a web browser of the third user update based on the bid before the server updates based on the bid.

According to another embodiment, a method includes receiving a first request from a first user and receiving a second request from a second user. The method also includes generating, based on a first user role for the first user, a first segment of javascript code. The first segment includes a first portion of javascript code and a second portion of javascript code. The method also includes generating, based on a second user role for the second user, a second segment of javascript code. The first segment is different from the second segment and the second segment includes the first portion of javascript code but not the second portion of javascript code. The method further includes communicating the first segment of the javascript code to a web browser of the first user and communicating the second segment of the javascript code to a web browser of the second user. The method also includes receiving a bid from the first user and communicating the bid to a server, the second user, and a third user. The web browser of the second user and a web browser of the third user update based on the bid before the server updates based on the bid.

According to yet another embodiment, a system includes a database, a server, and an auction security tool. The auction security tool receives a first request from a first user and receives a second request from a second user. The auction security tool also receives, from the database, a first user role for the first user and a second user role for the second user and generates, based on the first user role for the first user, a first segment of javascript code. The first segment includes a first portion of javascript code and a second portion of javascript code. The auction security tool also generates, based on the second user role for the second user, a second segment of javascript code. The first segment is different from the second segment and the second segment includes the first portion of javascript code but not the second portion of javascript code. The auction security tool further communicates the first segment of the javascript code to a web browser of the first user and communicates the second segment of the javascript code to a web browser of the second user. The auction security tool further receives a bid from the first user and communicates the bid to the server, the second user, and a third user. The web browser of the second user and a web browser of the third user update based on the bid before the server updates based on the bid.

Certain embodiments provide one or more technical advantages. For example, an embodiment improves the security of user devices by generating javascript code for each device based on the device's user's user role (e.g., privileges and access rights). As another example, an embodiment protects a server from traffic overload by broadcasting bids to user devices before the server updates for the bids. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
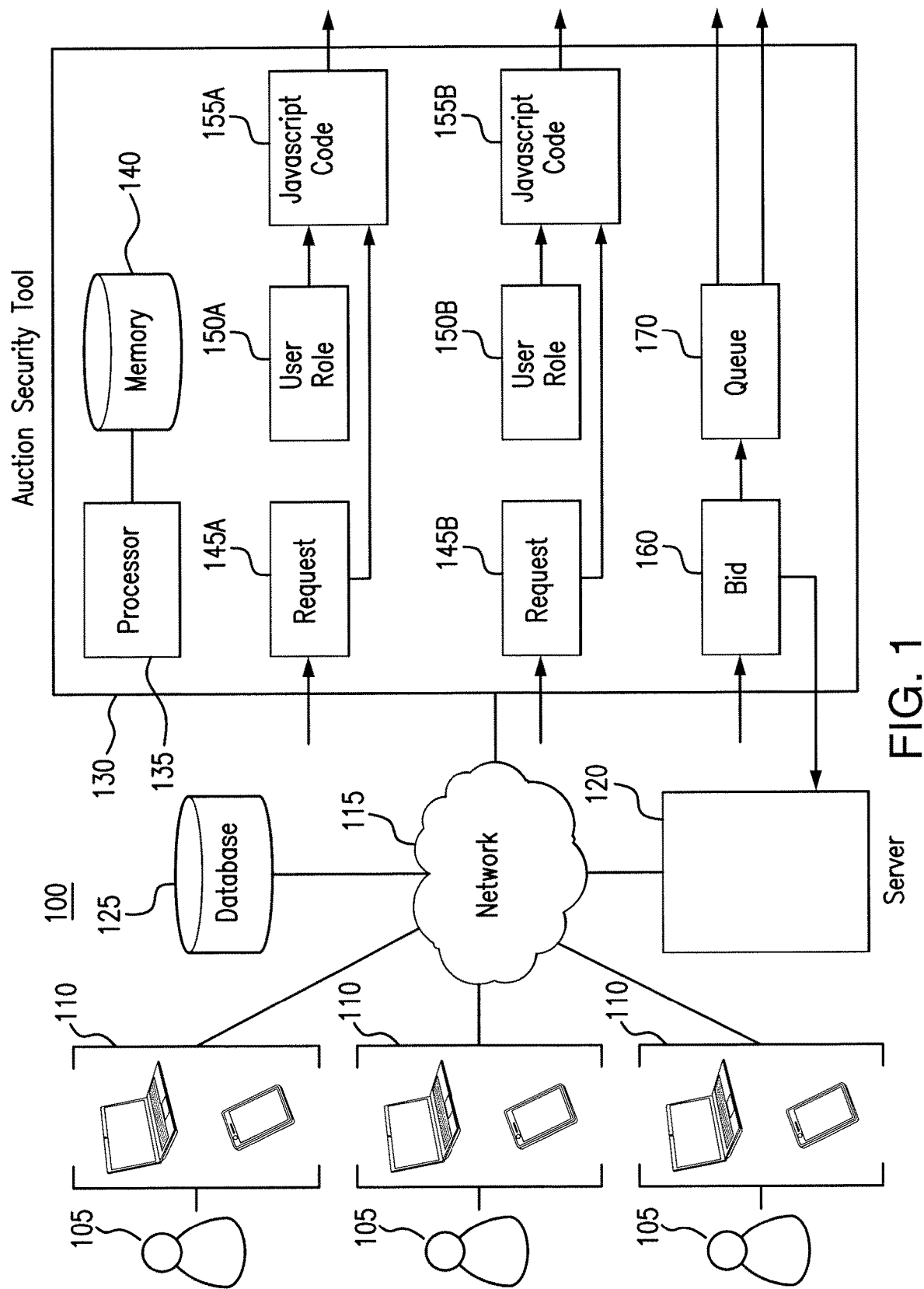
FIG. 1 illustrates a blind auction system.
Figure 2:
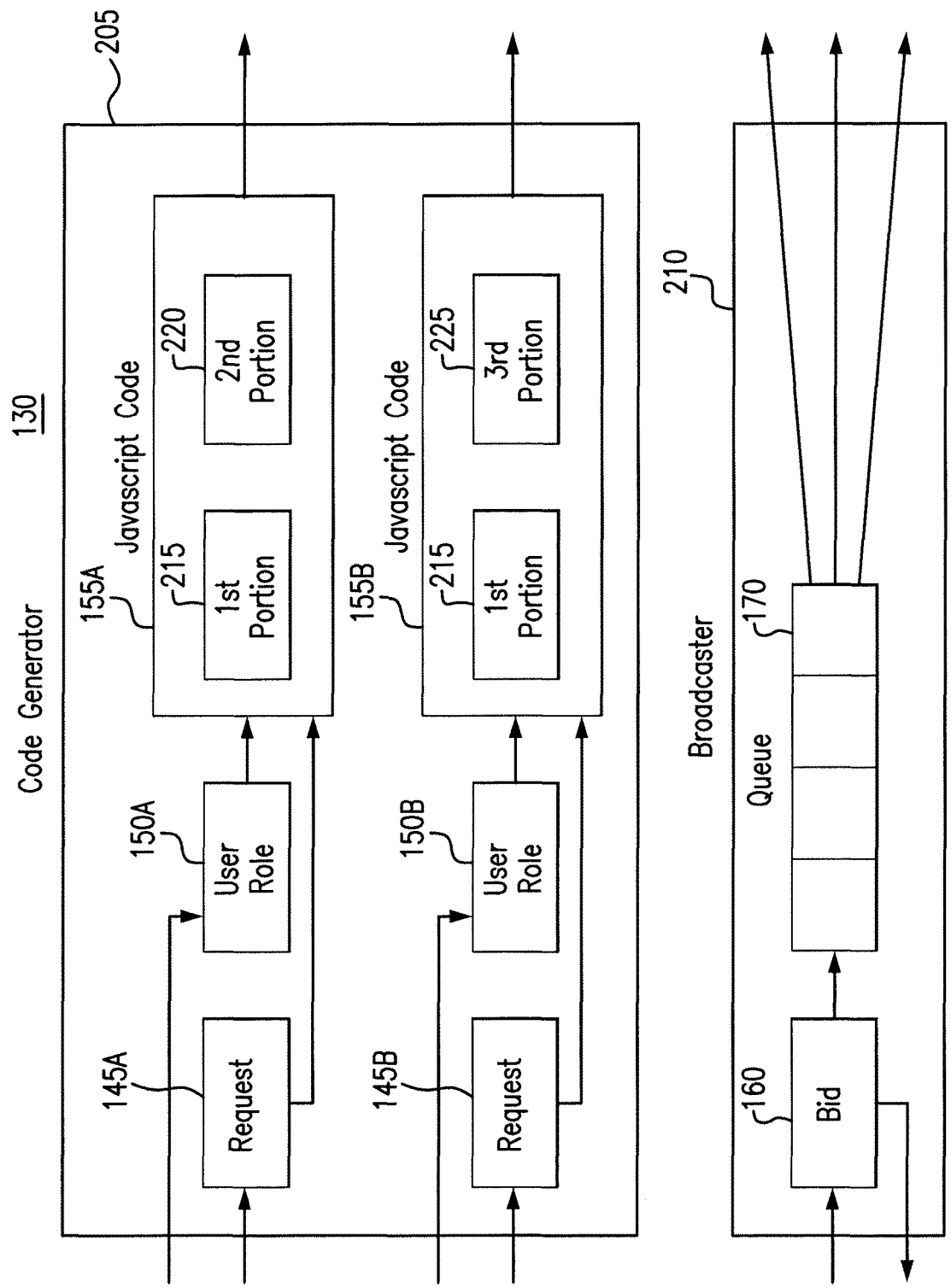
FIG. 2 illustrates an auction security tool of the system of FIG. 1.
Figure 3:
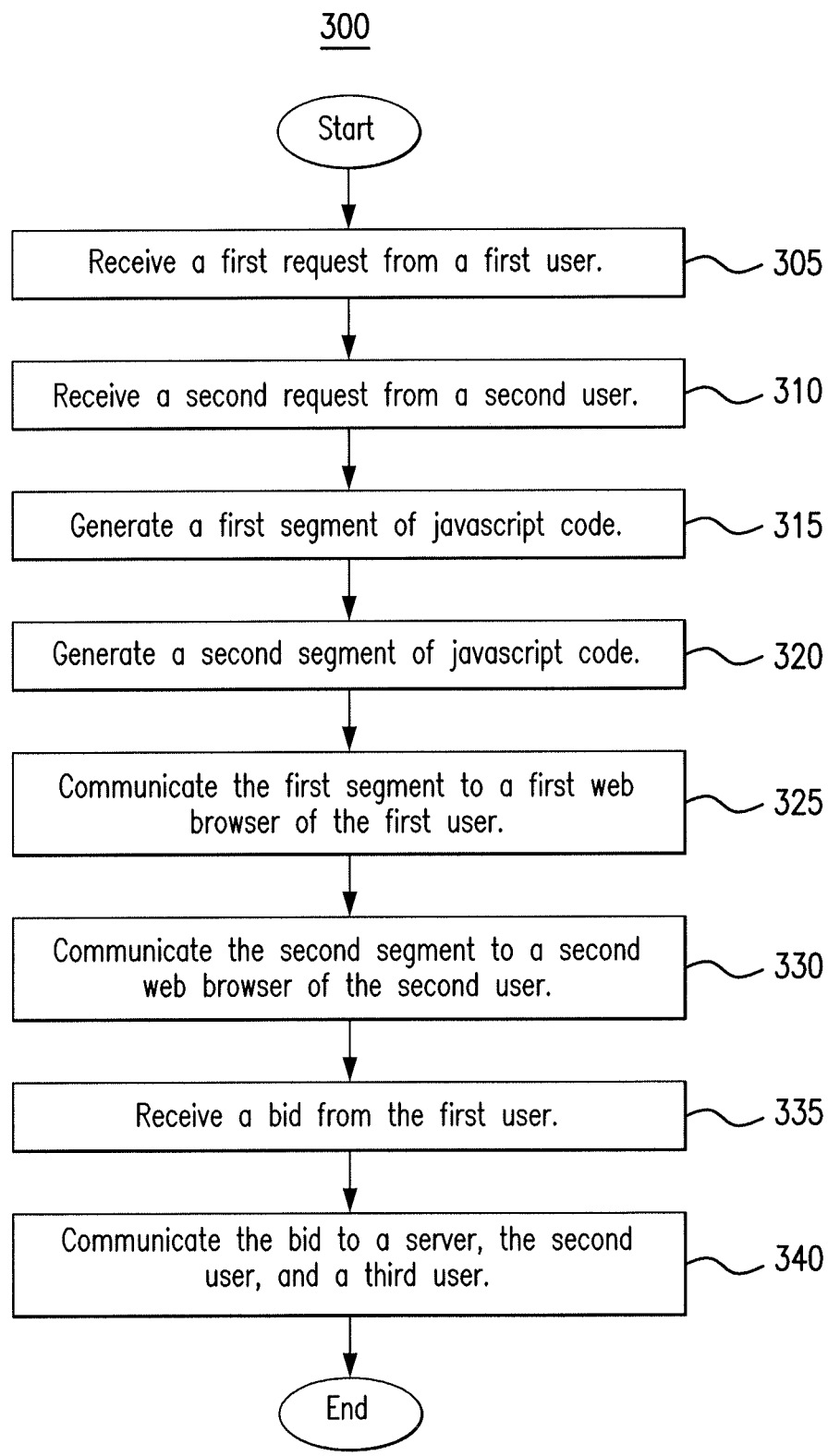
FIG. 3 is a flowchart illustrating a method for protecting users and servers using the system of FIG. 1.

Embodiments of the present disclosure and its advantages are best understood by referring to FIGS. 1 through 3 of the drawings, like numerals being used for like and corresponding parts of the various drawings.

Digital auctions are becoming increasingly popular as an efficient way to buy and sell goods. In these auctions, users use their computers to bid on items that are up for sale. These items can range from household goods to more complex products such as loans, stocks, and securities. The digital nature of these auctions allow for a type of auction called a blind auction. In a blind auction, the identity of buyers and sellers are unknown. In other words, buyers will not know who the seller of an item is. Conversely, sellers will not know the identity of buyers who are bidding on their items.

In a conventional digital auction house, each user is sent the same set of javascript code that implements a browser client. Each user's web browser receives and executes the javascript code to allow the user access to the digital auction house. However, because each user receives the same javascript code, the code is not configured based on the privileges, access rights, security restrictions, and preferences of a particular user. As a result, users may receive javascript code to which they should not have access. Though this code may remain in the background and the browser may not implement the code, the code nonetheless exists on the user's device. If the user's device is hacked or stolen, the hacker or thief may have access to the hidden code. They may then use the hidden code to hack the auction house or other users' devices.

Additionally, a digital auction house is conventionally implemented on a server, however, conventional communication protocols require user devices to send requests to the server and then wait for a response from the server before updating. A digital auction house may be used by many concurrent users who expect a real time response. If too many users are using the auction house, then the server may slow down and not respond to the users promptly thus degrading the integrity of the digital auction house. As a result, prices, bids, and items on the auction house may not update for every user as bids and prices are received. Thus, the auction house may not appear to be operating in real-time.

This disclosure contemplates an auction security tool that generates javascript code for a particular user based on a user role of that user. In this manner, users of the digital auction house may not receive the same javascript code. Rather, the javascript code received by a particular user is generated to accommodate that user's preferences, privileges, access rights, and security restrictions. As a result, even if that user's device is stolen and/or hacked, the hacker or thief may not be able to gain access to hidden javascript code that is not used by that device in certain embodiments.

Additionally, the auction security tool includes a broadcaster that queues and broadcasts messages from a user to many other users of the digital auction house. The broadcaster may communicate and/or broadcast these messages before the message is sent to the server to update the server. In this manner, the auction security tool asynchronously handles messages from users so that the users do not need to wait for a response from the server. The auction security tool preserves the real-time nature of the digital auction house even when many concurrent users are using the auction house in certain embodiments.

The auction security tool will be described in more detail using FIGS. 1-3. FIG. 1 will describe the auction security tool generally. FIGS. 2 and 3 will describe the auction security tool in more detail.

FIG. 1 illustrates a blind auction system 100. As illustrated in FIG. 1, system 100 includes one or more users 105, one or more devices 110, a network 115, a server 120, a database 125, and an auction security tool 130. In particular embodiments, system 100 improves the security of devices 110 and/or server 120 by generating javascript code that is particularized for an individual user 105.

Devices 110 may be configured to communicate with other components of system 100. For example, devices 110 may access a digital auction house implemented by system 100. Additionally devices 110 may communicate bids and/or offers to other components of system 100. Devices 110 may be any appropriate device for communicating with components of system 100 over network 115. For example, devices 110 may be a telephone, a mobile phone, a computer, a laptop, a tablet and/or an automated assistant. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Server 110 may be one or more devices that implement a digital auction house. For example, server 110 may monitor and track various auctions in the auction house. Server 120 may receive bids and update an auction based on the received bid. Additionally server 120 may determine the end of an auction and determine a winner of the auction. In certain embodiments, the auctions may be blind auctions. For example, a buyer may not know the identity of the seller of an item and a seller may not know the identities of buyers who are bidding on an item.

Database 125 stores information about users 105. For example, database 125 may store information that identifies a user 105. The information may also indicate privileges, access rights, security restrictions, and preferences of the user 105. Components of system 100 may use the information in database 125 to grant a user 105 access to the digital auction house.

In a conventional implementation of a digital auction house, each device 110 that is used to access the auction house receives the same javascript code to implement. When the javascript code is implemented, device 110 is able to present an auction house interface to user 105. User 105 may then interact with this interface to perfoini actions in the auction house. Sending the same javascript code to each device presents security concerns. For example, the javascript code may not be particularized for the distinct access rights, privileges and security restrictions of a particular user. As a result, the javascript code that is sent to the devices 110 may include code that is not implemented by a device 110 because of the particular user 105 using the device 110. This code that is not implemented is still communicated to device 110 but remains in the background and is not used by user 105. However, if the device 110 is stolen and/or hacked, a hacker or thief may still gain access to the unused code. The unused code may then be used to hack the auction house and/or other devices 110 of other users 105.

Additionally, as the number of users 105 using the auction house increases, so does the traffic to server 120. In a conventional auction house, each device 110 may communicate requests, bids, and/or messages to server 110 but may not update until server 120 responds to the request, bid, or message. When the number of users 105 increases, the response time of server 120 may increase correspondingly. As a result, the real-time nature of the auction house may be compromised. For example, a user 105 may submit a bid for an item but because of the slow response time of server 120, the auction may not update for all other users 105 until a later time. In that time, another user 105 may submit another bid that conflicts with the first bid. This conflict may frustrate the purpose of the auction.

Auction security tool 130 improves the security of system 100 and preserves the real-time nature of the auction house in certain embodiments. As illustrated in FIG. 1, auction security tool 130 includes a processor 135 and a memory 140. This disclosure contemplates processor 135 and memory 140 in configure to perform any of the function of auction security tool 130.

Processor 135 is any electronic circuitry, including, but not limited to microprocessors, application specific integrated circuits (ASIC), application specific instruction set processor (ASIP), and/or state machines, that communicatively couples to memory 140 and controls the operation of auction security tool 130. Processor 135 may be 8-bit, 16-bit, 32-bit, 64-bit or of any other suitable architecture. Processor 135 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 135 may include other hardware and software that operates to control and process information. Processor 135 executes software stored on memory to perform any of the functions described herein. Processor 135 controls the operation and administration of auction security tool 130 by processing information received from network 115, device(s) 110, and memory 140. Processor 135 may be a programmable logic device, a microcontroller, a microprocessor, any suitable processing device, or any suitable combination of the preceding. Processor 135 is not limited to a single processing device and may encompass multiple processing devices.

Memory 140 may store, either permanently or temporarily, data, operational software, or other information for processor 135. Memory 140 may include any one or a combination of volatile or non-volatile local or remote devices suitable for storing information. For example, memory 140 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 140, a disk, a CD, or a flash drive. In particular embodiments, the software may include an application executable by processor 135 to perform one or more of the functions described herein.

Auction security tool 130 may generate javascript code that is particularized for a user 105. Auction security tool 130 receives a first request 145A and a security request 145B. Each of these requests 145 may have come from a different user 105. In certain embodiments, these request 145 may be authentication requests that are issued when a user 105 desires to access the digital auction house.

In response to receiving request 145, auction security tool 130 may analyze request 145 to determine the user 105 that sent the request 145. Auction security tool 130 may then request and receive from database 125 a user role 150 for the user 105 that issued request 145. Each user role 150 may indicate the privileges, access rights, security restrictions, and/or preferences of the user 105. In the illustrated example of FIG. 1, auction security tool 130 receives first user role 150A for the user 105 that issued first request 145A. Auction security tool 130 also receives second user role 150B for the user 105 that issued second request 145B. Auction security tool 130 may glean the access rights, privileges, security restrictions, and preferences of each user 105 using their individual user roles 150.

Based on the user roles 150, auction security tool 130 may generate javascript code 155 that is particularized for a particular user 105. In the illustrated example of FIG. 1, auction security tool 130 generates first segment of javascript code 155A based on first user role 150A and first request 145A. Additionally, auction security tool 130 generates a second segment of javascript code 155B based on second user role 150B and second request 145B. The first segment of javascript code 155A may be different from the second segment of javascript code 155B because the users 105 may have different user roles 150. Auction security tool 130 may then communicate javascript code 155 to web browsers of their requesting users 105. In this manner, each user 105 may receive different javascript code 155 that is implemented by their devices 110. By implementing javascript code 155 that is particularized for the user 105, the security of system 100 may be improved. For example, if the device 110 is stolen and/or hacked, the device 110 may not contain hidden and/or unimplemented javascript code 155 that can be used to hack system 100 and/or other devices 110.

When a user 105 submits a bid 160, auction security tool 130 receives bid 160. Auction security tool 130 then communicates bid 160 to server 120. Server 120 may update the auction based on the received bid 160. However, if the number of concurrent users 105 on system 100 is great, server 120 may not update based on bid 160 for a period of time due to delay. Auction security tool 130 will then broadcast bids 160 that are stored in queue 170 to the other devices 110 and system 100. Devices 110 may then update based on the broadcasted bids 160. In this manner, devices 110 may update asynchronously from responses from server 120. As a result, when the number of concurrent users 105 is high, the real time nature of the auction house is preserved and maintained by auction security tool 130 in certain embodiments.

FIG. 2 illustrates an auction security tool 130 of the system 100 of FIG. 1. As illustrated in FIG. 2, auction security tool 130 includes a code generator 205 and a broadcaster 210. In particular embodiments, auction security tool 130 improves the security of a digital auction house by generating javascript code that is particularized for a user. Additionally, in some embodiments auction security tool 130 improves the operation of a digital auction house by broadcasting messages, requests, bids, etc. to multiple users without waiting for a response from an auction server.

Code generator 205 generates javascript code 155 for a particular user. As shown in FIG. 2, code generator 205 receives requests 145. A request 145 may be issued by a user. The request may be for example an authentication request to authenticated user so that the user can access the digital auction house. The example in FIG. 2, code generator 205 receives a first request 145A and a second request 145B. These requests 145 may be requests to authenticate a first user and a second user respectively.

Code generator 205 requests and receives user role 150, which may indicate privileges, access rights, security restrictions, and/or preferences for a user. Code generator 205 may request a user role 150 based on identification information in a received request 145. For example, request 145A may indicate a username for a user. Code generator 205 may request role 150A based on that username. User role 150A may indicate the privileges, access rights, security restrictions, and/or preferences of the user with that particular username.

Code generator 205 may generate javascript code 155 based on a request 145 and a user role 150. The generated javascript code 155 may be particularized to a user identified in request 145. For example, the generated javascript code 155 may include and/or exclude certain portions based on the privileges, access rights, and security restrictions indicated by a user role 150. In the illustrated example of FIG. 2 code generator 205 generates a first segment of javascript code 155A and a second segment of javascript code 155B based on first request 145A and user role 150A and second request 145B and user role 150B, respectively. The first segment of javascript code 155A may include a first portion 215 and a second portion 220. The first portion 215 and the second portion 220 may be different from each other. The second segment of javascript code 155B includes the first portion 215 and a third portion 225. The first portion 215 and the third portion 225 may be different from each other. Additionally, the second portion 220 and the third portion 225 may be different from each other. As can be seen in FIG. 2, the first segment of javascript code 155A does not include third portion 225, and the second segment of javascript code 155B does not include second portion 220. These differences may be a result of the different privileges, access rights, and security restrictions of two different users. For example, the security restrictions of a first user may indicate to code generator 205 that javascript code 155A should not include third portion 225. Conversely, the security restrictions of a second user may indicate to code generator 205 that a second segment of javascript code 155B should not include second portion 220. As a result, code generator 205 may generate javascript code 155 that is configured based on a user's privileges, access rights, and security restrictions. Code generator 205 may communicate javascript 155 to its respective users.

By including and excluding certain portions from generated javascript 155 based on a user role 150, code generator 205 improves the security of system 100. For example, a certain portion of javascript code may be excluded from a segment of javascript code because that portion may not be used or implemented by a user's device. By not communicating that portion of javascript code to the user's device, that portion of javascript code may be protected from a hacker who hacks or steals the user's device. As a result, that portion of javascript code may not be used by the hacker to hack the auction house or the devices of other users.

This disclosure contemplates code generator 205 generating any javascript code 155 based on a user role 150. The javascript 155 may include any number of portions based on the user role 150. For example, code generator 205 may generate a third segment of javascript code based on a third user role of a third user. The third segment of javascript code may include the second portion 220 but not the first portion 215.

In particular embodiments, a user device may purge a received segment of javascript code when the user logs off the digital auction house. In this manner, the security of the auction house is improved because a hacker or a thief may not be able to steal the javascript code to access the auction house after the user logs off.

Auction security tool 130 includes broadcaster 210 that asynchronously broadcasts messages, requests, bids, and other information from devices 110 to multiple other devices 110 in system 100. As illustrated in FIG. 2, broadcaster 210 receives a bid 160. This disclosure contemplates broadcaster 210 receiving any information from a device such as for example a request, a message, a bid, and/or other information. When bid 160 is received, broadcaster 210 sends bid 160 to an auction server so that the auction server may update the bids on a particular item with the received bid 160. Broadcaster 210 may then place bid 160 into queue 170. Broadcaster 210 may then broadcast items in queue 170 to multiple other devices in the system (e.g., the web browsers on those devices) without waiting for a response from the auction server. For example, the web browsers on those devices may update based on bid 160 before the server updates based on bid 160. In this manner, broadcaster 210 communicates messages to other devices of the system asynchronously from the auction server. As a result, the operation of the auction house is improved, especially when there are many concurrent users.

In an illustrative example, broadcaster 210 may communicate bid 160 to web browsers of a second and a third user. The web browsers of the second and third users may then update based on bid 160 before the server updates itself based on bid 160. As a result, the second and third user may see updated bid information without having to wait for the server to update and communicate the update to the other devices of the system.

In particular embodiments, broadcaster 210 may withhold an identity of a first user who communicated bid 160. In this manner, broadcaster 210 preserves the blind aspect of the auction house. As a result, the second and third users who receive bid 160 do not know the identity of the first user who communicated bid 160.

In certain embodiments broadcaster 210 may withhold communicating bid 160 to a certain user such as a fourth user based on a user role 150 of that fourth user. For example, the user role of that fourth user may indicate that the fourth user should not see any auctions for a particular item. Bid 160 may be for that particular item. As a result, broadcaster 210 may withhold communicating bid 160 to the fourth user. In this manner, the broadcaster 210 may communicate messages, requests and/or bids to users based on their user roles.

In particular embodiment, auction security tool 130 includes a match engine. The match engine generates suggestions based on information known about users 105. Using information contained in a match engine database (e.g., database 125 or a portion of database 125), the match engine attempts to identify items, based on an analysis of the user 105 and his purchase history, that may interest user 105. For example, the match engine analysis may be based on user trading data, portfolio holdings, and sales coverage inputs. security. Based on the analysis, parameters are established for when a personalized suggestion is appropriate. The parameters are employed in an algorithmic database query by the match engine. Suggestions are numerical and ephemeral as new information is collected about user 105 and security. The match engine may receive signals to recalculate the suggestion score. The suggested score is utilized to promote suggestions to users 105 in the auction house.

FIG. 3 is a flow chart illustrating a method 300 for protecting users and servers using the system 100 of FIG. 1. In particular embodiments, auction security tool 130 performs method 300. By performing method 300, auction security tool improves the security of an auction house and improves the operation of the auction house when there are many concurring users in certain embodiments.

Auction security tool 130 begins by receiving a first request from a first user in step 305. Auction security tool 130 receives a second request from a second user in step 310. In step 315, auction security tool 130 generates a first segment of javascript code. The first segment of javascript code may be generated based on a user role of the first user. In step 320, security tool 130 generates a second segment of javascript code. The second segment of javascript code may be generated based on a user role of the second user. The first segment of javascript code may include different portions of javascript code than the second segment of javascript code.

In step 325, auction security tool 130 communicates the first segment to a first web browser of the first user. The first web browser may then update itself based on the received first segment. In step 330, auction security tool 130 communicates the second segment to a second web browser of the second user. The second web browser may then update itself based on the received second segment. Auction security tool 130 then receives a bid from the first user in step 335. In step 340, auction security tool 130 communicates the bid to a server, the second user, and a third user. Communicating the bid may be asynchronous from the server's response to the bid.

Modifications, additions, or omissions may be made to method 300 depicted in FIG. 3. Method 300 may include more, fewer, or other steps. For example, steps may be performed in parallel or in any suitable order. While discussed as auction security tool 130 performing the steps, any suitable component of system 100 may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a processor configured to:
receive a first request from a first user;
receive a second request from a second user;
generate, based on a first user role for the first user, a first segment of code, the first segment comprising a first portion of code and a second portion of code;
generate, based on a second user role for the second user, a second segment of code, the first segment is different from the second segment, the second segment comprising the first portion of code but not the second portion of code;
communicate the first segment of the code to a web browser of the first user; and
communicate the second segment of the code to a web browser of the second user; and
the processor is further configured to:
receive a bid from the first user; and
communicate the bid to a server, the second user, and a third user, wherein the web browser of the second user and a web browser of the third user update based on the bid before the server updates based on the bid.

2. The apparatus of claim 1, wherein the first user role indicates at least one of a privilege and an access right of the first user.

3. The apparatus of claim 1, wherein the processor is further configured to withhold an identity of the first user when communicating the bid to the second user and the third user.

4. The apparatus of claim 1, wherein the processor is further configured to generate a third segment of code based on a third user role of the third user, the third segment comprising the second portion of code but not the first portion of code.

5. The apparatus of claim 1, wherein the processor is further configured to withhold communicating the bid to a fourth user based on a user role of the fourth user.

6. The apparatus of claim 1, wherein the first request is an authentication request.

7. The apparatus of claim 1, wherein the first segment of code is purged when the first user logs off.

8. An method comprising:
receiving a first request from a first user;
receiving a second request from a second user;
generating, based on a first user role for the first user, a first segment of code, the first segment comprising a first portion of code and a second portion of code;
generating, based on a second user role for the second user, a second segment of code, the first segment is different from the second segment, the second segment comprising the first portion of code but not the second portion of code;
communicating the first segment of the code to a web browser of the first user; and
communicating the second segment of the code to a web browser of the second user; and
receiving a bid from the first user; and
communicating the bid to a server, the second user, and a third user, wherein the web browser of the second user and a web browser of the third user update based on the bid before the server updates based on the bid.

9. The method of claim 8, wherein the first user role indicates at least one of a privilege and an access right of the first user.

10. The method of claim 8, further comprising withholding an identity of the first user when communicating the bid to the second user and the third user.

11. The method of claim 8, further comprising generating a third segment of code based on a third user role of the third user, the third segment comprising the second portion of code but not the first portion of code.

12. The method of claim 8, further comprising withholding communicating the bid to a fourth user based on a user role of the fourth user.

13. The method of claim 8, wherein the first request is an authentication request.

14. The method of claim 8, wherein the first segment of code is purged when the first user logs off.

15. A system comprising:
a database;
a server; and
a processor configured to:
receive a first request from a first user;
receive a second request from a second user;
receive, from the database, a first user role for the first user and a second user role for the second user;
generate, based on the first user role for the first user, a first segment of code, the first segment comprising a first portion of code and a second portion of code;
generate, based on the second user role for the second user, a second segment of code, the first segment is different from the second segment, the second segment comprising the first portion of code but not the second portion of code;
communicate the first segment of the code to a web browser of the first user; and
communicate the second segment of the code to a web browser of the second user; and
receive a bid from the first user; and
communicate the bid to the server, the second user, and a third user, wherein the web browser of the second user and a web browser of the third user update based on the bid before the server updates based on the bid.

16. The system of claim 15, wherein the first user role indicates at least one of a privilege and an access right of the first user.

17. The system of claim 15, wherein the processor is further configured to withhold an identity of the first user when communicating the bid to the second user and the third user.

18. The system of claim 15, wherein the processor is further configured to generate a third segment of code based on a third user role of the third user, the third segment comprising the second portion of code but not the first portion of code.

19. The system of claim 15, wherein the processor is further configured to withhold communicating the bid to a fourth user based on a user role of the fourth user.

20. The system of claim 15, wherein the first request is an authentication request.

21. The system of claim 15, wherein the first segment of code is purged when the first user logs off.

* * * * *